United States Patent Office 3,456,040
Patented July 15, 1969

3,456,040
MONOISOCYANATES OF CYCLIC PHOSPHORUS COMPOUNDS
Norio Onodera and Motohiko Nishide, Urawa-shi, Japan, assignors to Nitto Chemical Industry Co., Ltd., Tokyo, Japan, and Dainippon Ink Institute of Chemical Research, Urawa-shi, Japan
Filed Aug. 30, 1966, Ser. No. 576,052
Claims priority, application Japan, Aug. 31, 1965, 40/53,560
Int. Cl. C07d 105/04; C08g 22/30
U.S. Cl. 260—936
6 Claims

ABSTRACT OF THE DISCLOSURE

A phosphorus-containing cyclic monoisocyanate is represented by the formula:

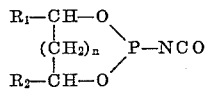

wherein $n$ is zero, one or two, $R_1$ and $R_2$ represent hydrogen atoms or methyl groups when $n$ is zero and represent hydrogen atoms when $n$ is one or two. The compound is useful in the manufacture of synthetic resin, and synthetic rubber, particularly fire-proof polyurethane.

---

The present invention relates to new phosphorus-containing cyclic monoisocyanates and a process for preparation thereof. More particularly the present invention relates to new compounds which have never been described in any literature and which are useful in the manufacture of fire-proof synthetic resins, synthetic rubbers, coating materials and the like, particularly fire-proof polyurethane foam and a process for preparation thereof.

The new compounds of the present invention are phosphorus-containing cyclic monoisocyanates represented by the general formula:

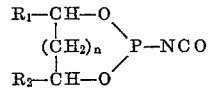

wherein $n$ is zero, one or two; $R_1$ and $R_2$ represent hydrogen atoms or methyl groups when $n$ is zero and represent hydrogen atoms when $n$ is one or two.

There are three kinds of polyurethane foam, flexible, semi-rigid and rigid, which are derived by a reaction of an isocyanate and such an active hydrogen-containing compound as a polyester or a polyether and which respectively have different ranges of use. Thus rigid polyurethane foams have found their wide use utilizing their excellent insulating action and mechanical strength, but they have suffered from a disadvantage in that they are combustible. This disadvantage is one of important obstacles to their industrial application and development. In order to obviate the above-mentioned disadvantage phosphorus-containing isocyanates have been satisfactorily used in a reaction with a polyhydroxy compound. However, the use of the phosphorus-containing isocyanates has never been economical since most of them may be obtained only through many steps. Even if they may be readily prepared, the production of foams is difficult owing to their large reactivity. It has been, therefore, difficult to obtain satisfactory phosphorus-containing isocyanates for this purpose.

Phosphorus-containing isocyanates having two or more isocyanate groups which are reactive with a hydroxyl group have been hitherto used in the manufacture of fireproof polyurethane foams. On the contrary, the phosphorus-containing isocyanates of the present invention are characterized by containing only one isocyanate group. If the monoisocyanate is reacted with a hydroxyl group-containing compound, it is observed that not only the isocyanate group is converted into a urethane group but also the cyclic portion is also reacted with the hydroxyl group to effect a ring opening. These phosphorus-containing cyclic monoisocyanates, therefore, may preferably be reacted, as bifunctional materials, with such hydroxyl group-containing materials as polyethers or polyesters in the manufacture of polyurethanes. Thus the monoisocyanates have an advantage in that they may be used as reactive flame retarders.

As can be seen from the above-mentioned reactivity of the phosphorus-containing isocyanates, they are effective in imparting fire resistance to not only polyurethane foams but also general high molecular weight compounds derived from compounds containing an active hydrogen at the end or side chain of their molecule. For example, they can be effectively used for polyester resins derived from polyester polyols or the like, polyurethane resins, polyurethane rubbers, alkyd resin coating materials, polyureas derived from polyamines, etc.

The materials of the present invention may be prepared by the first step of reacting phosphorus trichloride with a glycol by a known procedure to obtain a cyclic phosphorus chloride and by the second step of reacting the resultant compound with a cyanate. These two steps may be respectively carried out at a high yield.

The glycols which may be used in preparing the materials of the present invention include ethylene glycol, propylene glycol, trimethylene glycol, 2,3-butylene glycol and 1,4-butylene glycol.

Also, the cyanates which may be used in preparing the materials of the present invention include alkali cyanates such as sodium cyanate, potassium cyanate, ammonium cyanate and the like, and metal cyanates such as silver cyanate, lead cyanate and the like. Among them alkali metal cyanates such as sodium cyanate, potassium cyanate and the like are preferable, sodium cyanate being particularly preferable. It is desirable to use sodium cyanate having a purity from 60 to 100 percent, particularly from 80 to 100 percent. The amount of the cyanate employed may be from the theoretical amount to about 1.5 times the theoretical amount.

It is necessary for obtaining a high yield in the preparation of the cyclic phosphorus chloride to use an inert solvent such as methylene chloride, chloroform, trichloroethylene, perchloroethylene and the like. It is particularly preferable to employ said solvent in a freshly distilled form.

Also, it is necessary for obtaining a high yield in the reaction of a cyclic phosphorus chloride with a cyanate to use benzene, toluene, xylene, trichloroethylene, perchloroethylene, chloroform, acetonitrile or the like as an inert solvent, alone or in combination, said solvent being capable of dissolving the cyclic phosphorus chloride and the reaction product but incapable of dissolving the cyanate. If a mixture of said solvents is used, it is desirable to use acetonitrile as a component thereof. In the case of aromatic hydrocarbon solvents such as benzene or the like, it is preferable to use anhydrous ones obtained by a dehydration with metallic sodium followed by a distillation. Also, in the case of acetonitrile, it is preferable to use one obtained by a dehydration with phosphoric anhydride followed by a distillation. In the case of a mixture of benzene and acetonitrile, a mixing ratio by weight of benzene to acetonitrile is preferably 1:0.05 to 1.0, particularly 1:0.1 to 0.5. The amount of said inert solvent employed is suitably one to ten times, particularly three to five times the weight of said cyanate.

The reaction between phosphorus trichloride and a glycol may be caused by charging phosphorus trichloride into a reaction vessel together with an inert solvent and dropping a glycol thereinto at room temperature and then stirring the whole. The addition of the glycol may suitably require 30 to 60 minutes. After the dropping of the glycol an agitation is continued until the generation of hydrogen chloride ceases. After the completion of the reaction the solvent is removed and the residue is then distilled to obtain a cyclic phosphorus chloride. If said glycol is propylene glycol, it is preferred to simultaneously drop a solution of propylene glycol in an inert solvent and a solution of phosphorus trichloride in the same inert solvent into a reaction vessel.

The reaction between the cyclic phosphorus chloride and a cyanate may be caused by dropping the cyclic phosphorus chloride into a suspension of a cyanate in an inert solvent and heating and stirring the mixture. The reaction temperature should be 60° C. or higher and a range of 70° C. to the boiling point of the solvent is particularly preferable. A suspension of a cyanate in a solvent is heated to a desirable temperature, and the cyclic phosphorus chloride is added to the heated suspension with stirring. It is preferable to carry out the addition of the cyclic phosphorus chloride as fast as possible, but the compound should be added so that a suitable boiling state may be maintained since this reaction is exothermic. Therefore, ten to thirty minutes is suitable. Immediately after the completion of the addition of the cyclic phosphorus chloride or after the mixture has been reacted for a short time (desirably not longer than one hour) with stirring and the boiling of the solvent, the reaction mixture is quenched, and the resultant salt is filtered off. The solvent is then removed from the filtrate by distillation, and the resultant phosphorus-containing cyclic monoisocyanate is then recovered by distillation at reduced pressure. Care must be taken against moisture, because the phosphorus-containing cyclic monoisocyanate thus obtained is active and may readily react with moisture in air.

The structure of the product is first confirmed by its infrared absorption spectrum.

The materials of the present invention are illustrated in connection with the attached drawings, in which.

Figure 1:
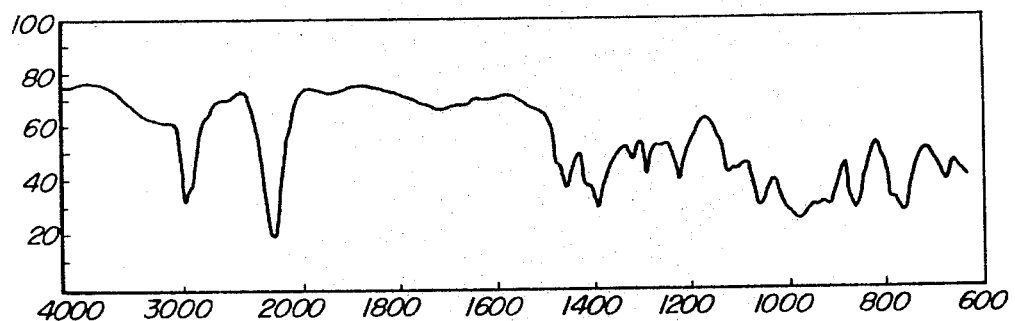
FIGURE 1 is an infrared absorption spectrum of 2-isocyanate-4-methyl-1,3,2-dioxaphospholane.
Figure 2:
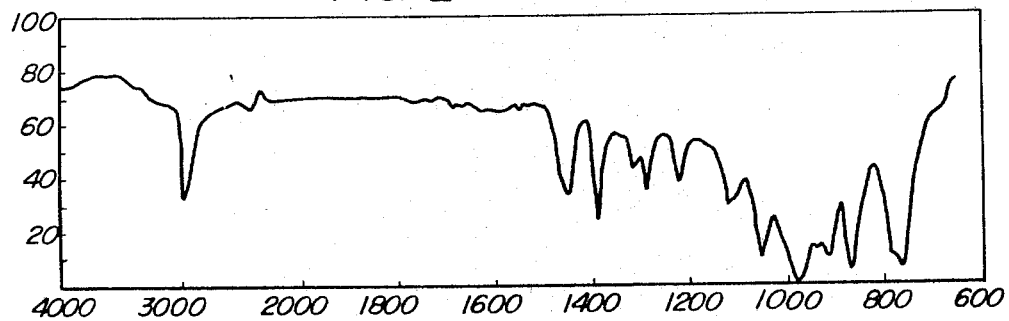
FIGURE 2 is an infrared absorption spectrum of 2-chloro-4-methyl-1,3,2-dioxaphospholane.

As can be seen from FIGURE 1, a phosphorus-containing cyclic monoisocyanate is found by its infrared absorption spectrum to have an absorption peculiar to a NCO group at 2,200 cm.$^{-1}$, and it is noticed that the monoisocyanate has the same structure except a NCO group compared with the spectrum of a five-membered ring phosphorus chloride in FIGURE 2.

Further the content of NCO group may be determined by reacting the phosphorus-containing cyclic monoisocyanate sample with di-n-butylamine and titrating the excess amine with perchloric acid. Further the phosphorus-containing cyclic monoisocyanate may be identified by an elementary analysis of nitrogen and phosphorus.

In order that those skilled in the art may better understand the present invention, the following examples and referential examples wherein polyurethane compounds are obtained from the phosphorus-containing isocyanates of the present invention are given by way of illustration and not by way of limitation.

EXAMPLE 1

344 grams of phosphorus trichloride in 500 milliliters of methylene chloride was charged into a two liter four-neck flask equipped with a condenser, a dropping funnel, a thermometer and a stirrer. Then 155 grams of ethylene glycol was dropped into the flask at room temperature over a period of about one hour. After dropping the mixture was warmed to 36° C., and was maintained at the temperature until the generation of hydrogen chloride ceased. After the reaction methylene chloride was distilled off and the residue was distilled at reduced pressure. Thus 253 grams of 2-chloro-1,3,2-dioxaphospholane,

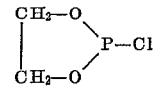

was obtained as a fraction of 45° to 46° C. at 15 mm. Hg (yield: 80 percent).

Then 75.5 grams of commercially available sodium cyanate (purity: 85 percent) was charged into a four-neck flask equipped with a condenser, a dropping funnel, a thermometer and a stirrer together with 262 milliliters of dehydrated benzene and 29 milliliters of acetonitrile. 122.8 grams of 2-chloro-1,3,2-dioxaphospholane which had been prepared above was dropped into the mixture over a period of fifteen minutes with heating at about 80° C. and stirring. After dropping the agitation was continued at 80° C. for thirty minutes.

After the reaction the resultant salt was filtered off, and the solvent was removed from the filtrate by distillation, and the residue was distilled at reduced pressure. Thus 116 grams of 2-isocyanate-1,3,2-dioxaphospholane,

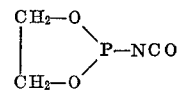

was obtained as a fraction of 55° to 57° C. at 15 mm. Hg (yield: 90 percent).

The infrared absorption analysis of the product showed the presence of a NCO group therein. The purity of the isocyanate was 99.5 percent from its NCO analysis value while its N analysis value was 10.28 percent (theoretical value: 10.50 percent) and its P analysis value was 22.95 percent (theoretical value: 23.29 percent).

EXAMPLE 2

Into a two liter three-necked flask equipped with a stirrer, a thermometer and a sixteen millimeter-diameter tube having two dropping funnels, said tube being at an angle of 15° to the horizontal, 50 milliliters of chloroform was charged. 180 grams of propylene glycol in 375 grams of chloroform was charged into one dropping funnel, while 353 grams of phosphorus trichloride in 375 grams of chloroform was charged into the other dropping funnel. They were simultaneously dropped into the flask at an equivalent ratio through the dropping funnels with stirring at room temperature. At this mixing point, considerable heat was generated and hydrogen chloride was produced. The dropping was completed over a period of about two hours. After the completion of the dropping, agitation was further continued until the generation of hydrogen chloride ceased. After the reaction chloroform solvent was distilled off and the residue was distilled at reduced pressure to obtain 308 grams of 2-chloro-4-methyl-1,3,2-dioxaphospholane having a boiling point of 74° to 77° C. at 15 mm. Hg (yield: 92.5 percent).

Then 70.2 grams of commercially available sodium cyanate (purity: 85 percent), 243 milliliters of dehydrated benzene and 29 milliliters of acetonitrile were charged into the same reaction apparatus as shown in Example 1 and were reacted with 126 grams of 2-chloro-4-methyl-1,3,2-dioxaphospholane under the same condition as in Example 1. After the solvent had been distilled off, 127.2 grams of 2-isocyanato-4-methyl-1,3,2-dioxaphospholane,

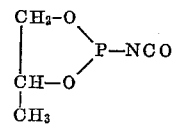

was obtained as a fraction of 84° to 85° C. at 50 mm. Hg by distillation at reduced pressure (yield: 96.2 percent).

The product was found to be an isocyanate compound by its infrared absorption spectrum. Its purity was 99.8 percent from its NCO group analysis value. Its N analysis value was 9.38 percent (theoretical value: 9.52 percent) and its P analysis value was 20.45 percent (theoretical value: 20.45 percent).

EXAMPLE 3

192 grams of 2-chloro-1,3,2-dioxaphosphorinane,

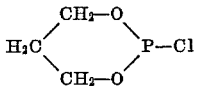

having a boiling point of 66° to 67° C. at 15 mm. Hg was obtained by a reaction of 152 grams of trimethylene glycol with 274.8 grams of phosphorus trichloride in the same manner and with the same apparatus as in Example 1 (yield: 68 percent).

Then 89.0 grams of potassium cyanate, 250 milliliters of dehydrated benzene and 30 milliliters of acetonitrile were charged into the same reaction apparatus as shown in Example 1 and were reacted with 120.3 grams of 2-chloro-1,3,2-dioxaphosphorinane under the same condition as in Example 1. After the reaction the resultant salt was separated and the solvent was distilled off. The residue was distilled at reduced pressure to obtain 135.5 grams of 2-isocyanato-1,3,2-dioxaphosphorinane,

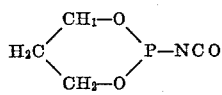

as a fraction of 82° to 83° C. at 20 mm. Hg (yield: 92.2 percent).

The purity of the isocyanate was 99.7 percent from its NCO group analysis value. Its N analysis value was 9.82 percent (theoretical value: 9.52 percent) and its P analysis value was 20.52 percent (theoretical value: 21.08 percent).

EXAMPLE 4

116 grams of 2-chloro-4,5-dimethyl-1,3,2-dioxaphospholane,

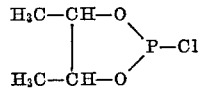

having a boiling point of 66° to 67° C. at 15 mm. Hg was obtained by a reaction of 90 grams of meso-2,3-butylene glycol (M.P.: 34.6° C.) with 137.5 grams of phosphorus trichloride using the same apparatus and the same procedures as in Example 1 (yield: 75 percent).

Then 40.0 grams of commercially available sodium cyanate (purity: 85 percent), 130 milliliters of dehydrated benzene and 15 milliliters of acetonitrile were reacted with 77.3 grams of 2-chloro-4,5-dimethyl-1,3,2-dioxaphospholane in the same apparatus and under the same condition as in Example 1. The resultant salt was separated and the solvent was distilled off. The residue was then distilled at reduced pressure to obtain 72.8 grams of 2-isocyanato-4,5-dimethyl-1,3,2-dioxaphospholane,

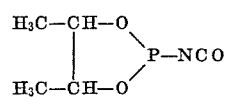

having a boiling point of 93° to 94° C. at 15 mm. Hg (yield: 90.5 percent).

The purity of the isocyanate was 99.5 percent from the analysis value of its NCO group. Its N analysis value was 8.58 percent (theoretical value: 8.70 percent) and its P analysis value was 19.53 percent (theoretical value: 19.24 percent).

EXAMPLE 5

140 grams of colorless liquid 2-chloro-1,3,2-dioxaphosphepane,

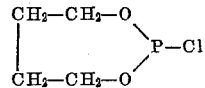

having a boiling point of 75° to 76° C. at 10 mm. Hg was obtained by a reaction of 90 grams of 1,4-butylene glycol with 138 grams of phosphorus trichloride using the same apparatus and the same procdures as in Example 1 (yield: 91.5 percent).

Then 40.0 grams of commercially available sodium cyanate (purity: 85 percent), 130 milliliters of dehydrated benzene and 15 milliliters of acetonitrile were reacted with 77.3 grams of 2-chloro-1,3,2-dioxaphosphepane in the same apparatus and under the same condition as in Example 1. The resultant salt was separated and the solvent was distilled off from the filtrate. The residue was then distilled at reduced pressure to obtain 70.8 grams of 2-isocyanato-1,3,2-dioxaphosphepane,

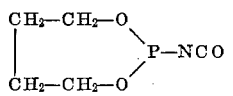

having a boiling point of 93° to 94° C. at 15 mm. Hg (yield: 88 percent).

The infrared absorption analysis of the product showed the presence of a NCO group therein. The purity of the isocyanate was 99.3 percent from the analysis value of NCO group. Its N analysis value was 8.32 percent (theoretical value: 8.70 percent) and its P analysis value was 20.02 percent (theoretical value: 19.24 percent).

REFERENTIAL EXAMPLE 1

To 100 parts of polyether LS–490 for rigid polyurethanes (hydroxy value: 477) 16 parts of 2-isocyanato-1,3,2-dioxapholane,

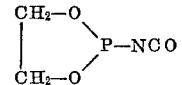

was added and the whole was stirred at room temperature. The temperature rose to 33° C. After standing overnight the mixture was heated to 100° C. and was kept at a reduced pressure of 1 to 2 mm. Hg. Thus a colorless, clear and viscous polyol was obtained containing phosphorus and a urethane group and having a hydroxyl value of 310 and a viscosity of 32,000 centipoises at 28° C.

80 parts of the polyol thus prepared, 1.0 part of dibutyl tin dilaurate, 0.5 part of a silicone oil (L–520) and 15 parts of trichloromonofluoromethane were mixed. Then 42 parts of tolylene diisocyanate was added thereto, and the mixture was mixed for ten seconds with a stirrer of 3000 r.p.m. The mixture was immediately transferred into a paper box where it was foamed. After the raising of the foam had been completed, the foam was heated to 70° C. for one hour. Thus a rigid polyurethane foam was obtained. The physical properties of the product as measured on the next day were as follows:

Density _____ g./cm.³__ 0.040
Compressive strength _____ kg./cm.²__ 1.8
Impact strength _____ kg./cm.___ 0.5
Dimensional stability _____ Good
Burning resistance (according to ASTM,
 D–1692–59T) _____ Self-extinguishing

REFERENTIAL EXAMPLE 2

To 100 parts of polyether LS–490 16.5 parts of 2-isocyanato-4-methyl-1,3,2-dioxaphospholane,

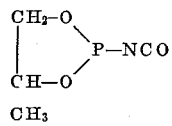

was added and the mixture was stirred at room temperature in the same manner as in Referential Example 1. After standing overnight a colorless, clear and viscous polyether was obtained having a hydroxyl value of 331.4 and a viscosity of 22,000 centipoises at 28° C.

84.7 parts of the polyether thus prepared, 0.7 part of dibutyl tin dilaurate, 0.5 part of silicone oil L–520 and 15 parts of trichloromonofluoromethane were mixed. Then 46.5 parts of tolylene diisocyanate was added thereto. The whole was mixed for ten seconds with a stirrer of 3000 r.p.m., and the mixture was immediately transferred into a paper box where it was foamed. After the raising of the foam had been completed, the foam was heated to 70° C. for one hour. Thus a rigid polyurethane foam was obtained. The physical properties of the product were measured on the next day.

Density _____ g./cm.$^2$__ 0.033
Compressive strength _____ kg./cm.$^2$__ 2.0
Impact strength _____ kg./cm.__ 0.7
Dimensional stability _____ Good
Burning resistance (according to ASTM,
   D-1692-59T) _____ Self-extinguishing

What we claim is:

1. A phosphorus-containing cyclic monoisocyanate represented by the formula:

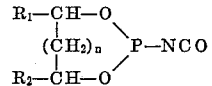

wherein $n$ is zero, one or two, $R_1$ and $R_2$ represent hydrogen atoms or methyl groups when $n$ is zero and represent hydrogen atoms when $n$ is one or two.

2. 2-isocyanato-1,3,2-dioxaphospholane.
3. 2-isocyanato-4-methyl-1,3,2-dioxaphospholane.
4. 2-isocyanato-1,3,2-dioxaphosphorinane.
5. 2-isocyanato-4,5-dimethyl-1,3,2-dioxaphospholane.
6. 2-isocyanato-1,3,2-dioxaphosphepane.

References Cited

FOREIGN PATENTS 968,886   9/1964   Great Britain.

OTHER REFERENCES

Rossiiskaya et al.: "Chemical Abstracts," vol. 42, 292416) (1948).

JOSEPH P. BRUST, Primary Examiner
ANTON H. SUTTO, Assistant Examiner

U.S. Cl. X.R.

260—2.5, 75, 77.5, 937, 968, 976